Sept. 30, 1924.
A. A. ALLISON
POWER BALER
Filed April 3, 1922    2 Sheets-Sheet 1
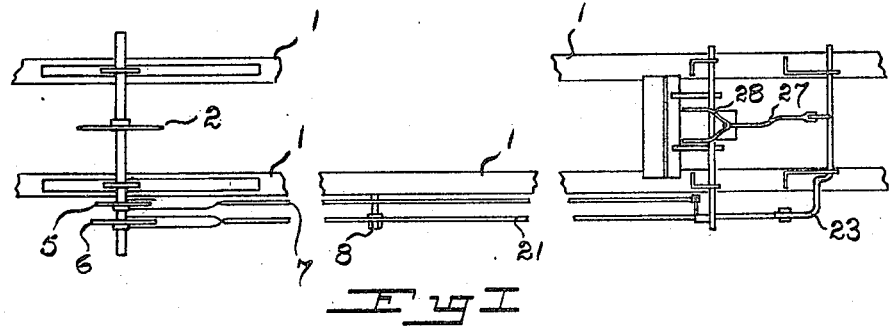
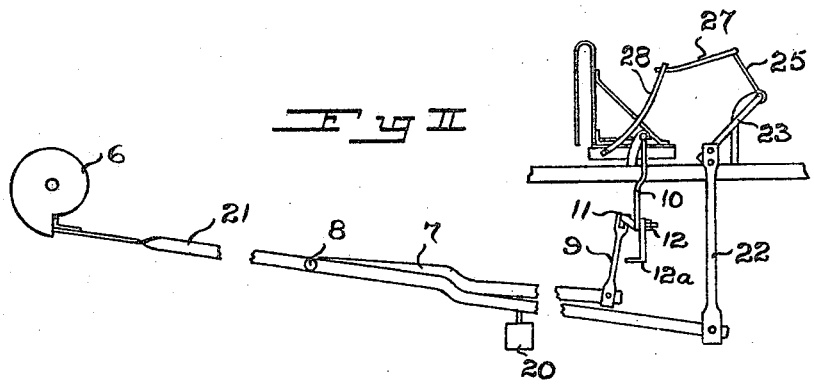
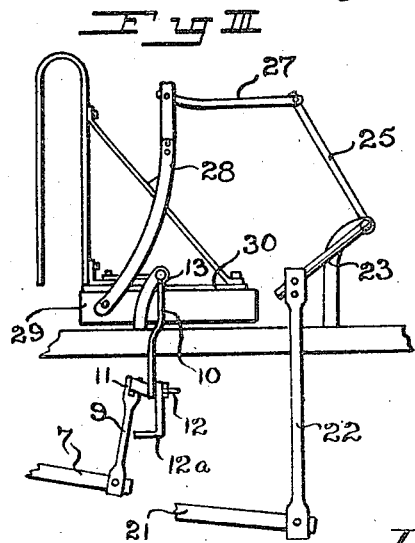
Inventor
A. A. Allison,
By Marks & Clerk
Attys.

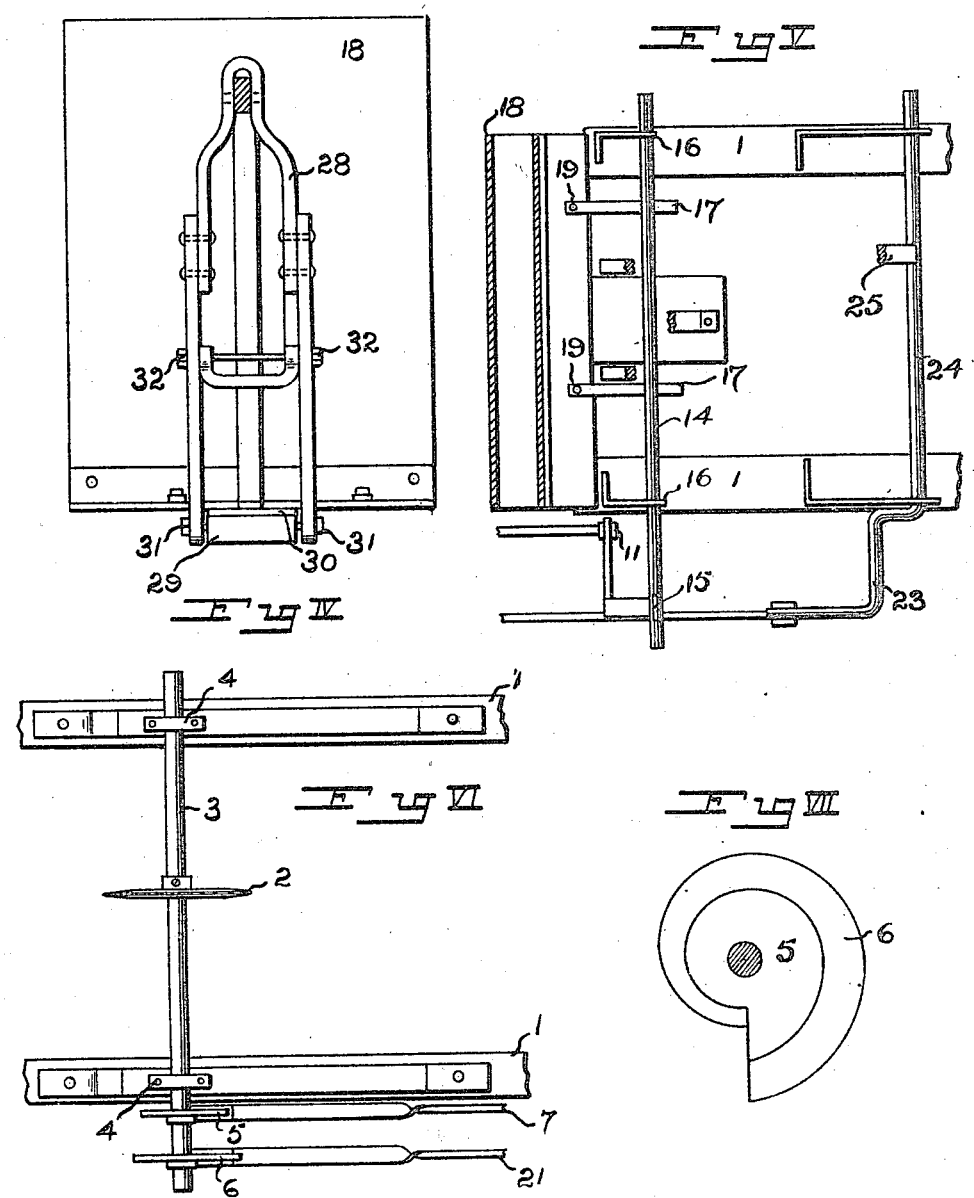

Patented Sept. 30, 1924.

1,510,371

UNITED STATES PATENT OFFICE.

ARNOLD ABRAHAM ALLISON, OF TEAKWORTH, TRANSVAAL, SOUTH AFRICA.

POWER BALER.

Application filed April 3, 1922. Serial No. 549,162.

*To all whom it may concern:*

Be it known that I, ARNOLD ABRAHAM ALLISON, subject of the King of Great Britain, residing at Teakworth, Transvaal Province of the Union of South Africa, have invented certain new and useful Improvements in Power Balers, of which the following is a specification.

This invention relates to power baling presses for hay and the like and has for its object the production of a press in which the division blocks can be automatically placed in the position for dropping into the bale chamber at the correct moment and in which it is impossible for a division block to fall into the bale chamber at the wrong moment.

It has previously been proposed to insert a division block into a movable cage which can be moved into position for dropping the block by an operator who is dependent on an audible signal produced by the passage of a bale through the machine, which indicates the right period during which to pull the lever.

According to this invention the operator and the lever are dispensed with and a movable cage is pushed into position by the action of the ram of the machine itself in conjunction with movable means on the cage, said movable means being controlled, so as to cause the ram to close the cage or to have no effect to close it, by means operated by the discharge of a finished bale from the machine.

Means are also provided whereby the cage is locked in the open position except when conditions are such that it is on the point of being closed by the action of the ram.

The invention is illustrated in the accompanying drawings in which

Fig. I shows a part plan of the device.
Fig. II shows a part side elevation.
Fig. III shows a detail side elevation of the cage and adjoining mechanism.
Fig. IV shows an end view of the cage.
Fig. V shows a plan partly in section of the cage and the means for closing it.
Fig. VI shows a plan of the controlling means operated by the bale emerging from the machine.
Fig. VII shows a detail of the cams shown in Fig. VI.

In the drawings 1, 1, denote parts of the frame of a power baler which is not shown as the construction of these machines is well-known.

At that end of the baler whence the finished bales emerge is a toothed wheel 2 mounted fast on a rotatable shaft 3 carried in bearings 4 on the framework 1 of the machine.

On this shaft are secured cams 5 and 6, cam 6 controlling the locking mechanism and cam 5 the closing mechanism for the cage as hereinafter described.

Cam 5 works in conjunction with a lever 7 pivoted at 8 and connected at the end remote from the cam with a lever 9. This lever is connected to a link 10 by means of a pivot joint 11. The link 10 is of general bell crank form and is pivoted at 12 to a bracket 12$^a$ fixed to the frame. The lever 10 is therefore capable of movement about the pivot 12 by movement of the lever 9 and the other end of the link 10 is connected at 13 with a rod 14 by means of an axially movable slot 15 in the said rod through which the end 13 of the lever 10 passes.

The rod 14 is slidably mounted in bearings 16 on the framework 1 and operates fingers 17 pivoted to the cage 18 at 19.

When the cams are in the position shown in Fig. II the fingers 17 are in such a position that the projections on the ram (not shown) which reciprocates beneath the same, come in contact with the fingers and push the cage forward to the left into the closed position. These projections may be specially fitted on the ram or they may form part of the ordinary mechanism.

When the cams have turned through, say 45°, from the position shown in Fig. II, the fingers 17 will be swung by the bar 14 through the action of the system of levers into such a position that they will be out of the path of movement of the said projections on the ram and the cage will, therefore, not be closed.

A weight 20 is adjustably attached to the lever 7 so that there is a positive action on the bar 14.

In order to prevent the cage 18 moving forward into position at the wrong time owing to vibration which is very severe, the cam 6 works in conjunction with a lever 21 pivoted at 8 and connected by a link 22 with an arm 23 attached to a rock shaft 24 which has on it a fixed arm 25.

The shaft 24 is mounted in bearings 26 on the frame 1.

The arm 25 is connected through a link 27 to a yoke 28.

The yoke 28 is pivoted at 31 to a fixed part 29 which forms a bearing plate for an extension 30 of the cage 18, the connection to the cage itself being made by a pin and slot joint 32.

It will be seen that so long as the end of the lever 21 is on the high part of the arm 6, the arm 25 through the link 27 and yoke 28 will hold the cage in the open position whatever the vibration may be. The mechanism operates as follows: As the ram (not shown) moves toward the left in Fig. 1 and a bale passes by the wheel 2, said wheel will turn and the cam 5 will rock the lever 7, so that the fingers 17 will occupy the position shown in Fig. I. In this position the lugs on the ram will strike the projections 17 and move the cage 18 toward the left, so that the division blocks will be automatically released from the cage. As the cam 5 continues to turn, the cage will be retracted so that its lower open end will lie over the fixed support 29 and other division blocks may be placed in the cage.

I claim:—

1. In a power baler for hay and the like, the combination with a fixed support, of a cage having a normally open lower end adapted to be closed by said fixed support, fingers pivotally connected to said cage and adapted to be struck by lugs on a ram for moving the cage to a position to open its lower end, an axially movable rod connected to the fingers for moving the latter out of operative position, a lever connected to the rod, a link connected to the lever, a second lever connected to the link, a cam engaging the second lever, a shaft on which the cam is mounted, and a wheel fixed to said shaft and adapted to be rotated by a bale emerging from the baler.

2. In a power baler for hay and the like, the combination with a fixed support, of a cage having a normally open lower end adapted to be closed by said fixed support, fingers pivotally connected to said cage and adapted to be struck by lugs on said ram for moving the cage to a position to open its lower end, an axially movable rod connected to the fingers for moving the latter out of operative position, a lever connected to the rod, a link connected to the lever, a second lever connected to the link, a cam engaging the second lever, a shaft on which the cam is mounted, a wheel fixed to said shaft and adapted to be rotated by a bale emerging from the baler, a second cam mounted on said shaft, a third lever engageable with the last mentioned cam, a link connected to the third lever, a rock shaft having an arm connected to the last mentioned link, a second arm on the rock shaft, a yoke pivotally connected to the fixed support, a link connecting the yoke to the second arm, and means connecting said yoke to said cage.

In testimony whereof I affix my signature.

ARNOLD ABRAHAM ALLISON.